United States Patent [19]

Kim

[11] Patent Number: 5,963,617
[45] Date of Patent: Oct. 5, 1999

[54] METHOD FOR TRANSFERRING REGISTERED SPEECH MESSAGE FROM AUTOMATIC TELEPHONE ANSWERING SYSTEM AT A RESERVED TIME

[75] Inventor: Sung-Hyun Kim, Gumi, Rep. of Korea

[73] Assignee: SamSung Electronics Co., Ltd., Suwon, Rep. of Korea

[21] Appl. No.: 08/785,741

[22] Filed: Jan. 17, 1997

[30]    Foreign Application Priority Data

Jan. 19, 1996  [KR]  Rep. of Korea ................... 96-1176

[51] Int. Cl.⁶ ................................................. H04M 1/64
[52] U.S. Cl. .......................... 379/67.1; 379/76; 379/77; 379/83; 379/88.09; 379/88.22; 379/88.25; 379/88.27; 379/88.28
[58] Field of Search .................... 379/67, 88, 89, 379/67.1, 88.01, 207, 76, 77, 83, 88.09, 88.22, 88.25, 88.27, 88.28, 130, 131, 206, 209, 261, 288

[56]         References Cited

U.S. PATENT DOCUMENTS

| 4,481,382 | 11/1984 | Villa-Real ............................... 455/556 |
| 4,503,288 | 3/1985 | Kessler ....................................... 379/67 |
| 4,624,578 | 11/1986 | Green ........................................ 368/10 |
| 4,757,525 | 7/1988 | Matthews et al. ........................ 379/89 |
| 4,958,366 | 9/1990 | Hashimoto ................................ 379/74 |
| 4,998,272 | 3/1991 | Hawkins, Jr. ............................ 379/88 |
| 5,075,894 | 12/1991 | Iwase et al. .............................. 379/69 |
| 5,199,009 | 3/1993 | Svast ...................................... 368/240 |
| 5,278,896 | 1/1994 | Sakata et al. ............................. 379/70 |
| 5,394,445 | 2/1995 | Ball et al. ............................. 379/67.1 |
| 5,400,393 | 3/1995 | Knuth et al. ............................. 379/88 |
| 5,436,963 | 7/1995 | Fitzpatrick et al. ................... 379/212 |
| 5,481,594 | 1/1996 | Shen et al. ............................... 379/67 |
| 5,483,578 | 1/1996 | Ackermann et al. .................. 379/67.1 |
| 5,509,061 | 4/1996 | Amereller et al. ...................... 379/207 |
| 5,524,140 | 6/1996 | Klausner et al. ......................... 379/67 |
| 5,533,104 | 7/1996 | Weiss et al. .............................. 379/70 |
| 5,559,872 | 9/1996 | Van Huyssteen ....................... 379/130 |
| 5,623,538 | 4/1997 | Petty ...................................... 379/67.1 |

FOREIGN PATENT DOCUMENTS 554 180 A2   8/1993   European Pat. Off. .
2270443   of 0000   United Kingdom .

*Primary Examiner*—Krista Zele
*Assistant Examiner*—Allan Hoosain
*Attorney, Agent, or Firm*—Robert E. Bushnell, Esq.

[57]          ABSTRACT

A method for transferring a speech message registered by a user from an automatic telephone answering system at a reserved time wherein the reserved time and speech message are registered along with a telephone number so that the registered speech message can be automatically transferred at the reserved time as the telephone number is automatically dialed at the reserved time. The method includes selecting a memory area for registering desired data, when a registration mode setting key is input, receiving a reservation time key signal and then registering the reservation time on the selected memory area, receiving a telephone number key signal and then registering the telephone number on the selected memory area, receiving a speech message key signal and then registering the speech message on the selected memory area, comparing the registered reservation time with the current time detected by the timer to thereby detect whether or not the registered reservation time corresponds to the current time, reading out the registered telephone number at the reservation time and dialing the telephone number to establish a transfer loop, and audibly synthesizing the registered speech message when the transfer loop is established and then transferring the speech message via the transfer loop.

7 Claims, 7 Drawing Sheets

METHOD FOR TRANSFERRING REGISTERED SPEECH MESSAGE FROM AUTOMATIC TELEPHONE ANSWERING SYSTEM AT A RESERVED TIME

CLAIM FOR PRIORITY UNDER 35 U.S.C. §119

This application makes reference to, incorporates the same herein, and claims all benefits accruing under 35 U.S.C. §119 from an application for *Method For Transferring Registered Speech Message From Automatic Telephone Answering Machine At A Reserved Time* earlier filed in the Korean Industrial Property Office on Jan. 19, 1996, and there duly assigned Ser. No. 1176/1996.

BACKGROUND OF THE INVENTION

1. Technical Field

The present invention relates to an automatic telephone answering system, and more particularly, relates to a method for automatically transferring a speech message registered previously by a user in an automatic telephone answering system to a telephone set of a designated party at a reserved time.

2. Related Art

An automatic telephone answering system responds to an incoming telephone call if the call is not answered by a user. Such systems as disclosed, for example, in U.S. Pat. No. 5,278,896 for *Automatic Answering Telephone Apparatus* issued to Sakata et al., may play a prerecorded message or record a message from the caller. Some systems may offer the caller or the called party additional choices, such as the ability to access individual extensions by dialing extension or individual numbers by spelling the person's name on the caller's telephone keypad, and the ability to connect to a backup person in the absence of the user, the person to whom the call is directed. Other systems such as U.S. Pat. No. 5,436,963 for *Telephone Answering Method And Apparatus* issued to Fitzpatrick et al., inform the caller of the remote location where the user is scheduled to be, and at the caller's option, transfer the incoming telephone call to the scheduled location or telephone number of the user. U.S. Pat. No. 4,958,366 for *Telephone Answering Method And Device Providing Outgoing Message In A Selected Language* issued to Hashimoto, even offers the caller the ability to receive the prerecorded message in one of several different foreign languages. U.S. Pat. No. 5,075,894 for *Telephone Message Forwarding Apparatus* issued to Iwase et al., automatically and sequentially transfers the same prerecorded message to a plurality of persons at different destinations. Recent systems such as disclosed in U.S. Pat. No. 5,533,104 for *Telephone Answering Device And Method* issued to Weiss et al., allows the user to switch an incoming telephone call from a caller to the message recording or answering machine after the user has initially spoken to the caller.

Generally, when an incoming telephone call from the caller is recorded a recording medium such as a tape or an audio memory, the user can access the content of the recorded message by either manually pressing a playback button located on the automatic telephone answering system when the user is present at the automatic telephone answering system shortly after the incoming telephone call, or by having previously configured the system to forward the recorded message to the user at a remote location when the user, who is absent from the automatic telephone answering system, calls in to request for the transmission of such a recorded message. In such conventional message reproduction techniques, as I have observed however, the transfer of the recorded message is performed only when a request for such a message is externally made. Further, it is impossible to transfer the user message to a remote location associated with a desired telephone number at a particular time in the absence of the user.

SUMMARY OF THE INVENTION

Accordingly, it is therefore an object of the present invention to provide an improved automatic telephone answering system.

It is also an object to provide an automatic telephone answering system and process of transferring a registered speech message from an automatic telephone answering system at a reserved time.

It is further an object to provide an automatic telephone answering system and process of automatically dialing a counterpart's telephone number registered at the automatic telephone answering system at a reserved time to establish a communication channel, and automatically transferring a speech message registered at the automatic telephone answering system via the communication channel at the reserved time.

In accordance with one aspect of the present invention, the user first registers a telephone number, a reserved time, and records a desired speech message in an automatic telephone answering machine. The current time and the registered reservation time are displayed on an operational panel. Once the current time reaches the registered reservation time, the registered telephone number is automatically dialed. When the call is answered, the pre-recorded speech message is transmitted. If no one answers, then the registered telephone number is re-dialed periodically for a given time interval until either the call is answered or the expiration of a predetermined time period.

A process of transferring, at a reserved time, a registered speech message from an automatic telephone answering system equipped with a timer for counting data representing a current time, includes the steps of: selecting a memory area for registering desired data, when a registration mode setting key is input; receiving a key signal associated with a reservation time, and registering the reservation time on the selected memory area; receiving a key signal associated with a telephone number after a completion of the reservation time registration, and registering the telephone number on the selected memory area; receiving a key signal associated with a speech message after a completion of the telephone number registration, and registering the speech message on the selected memory area; comparing the registered reservation time with the current time detected by the timer to thereby detect whether or not the registered reservation time corresponds to the current time; reading out the registered telephone number at the reservation time and dialing the telephone number to establish a transfer loop; and audibly synthesizing the registered speech message when the transfer loop is established and then transferring the speech message via the transfer loop.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
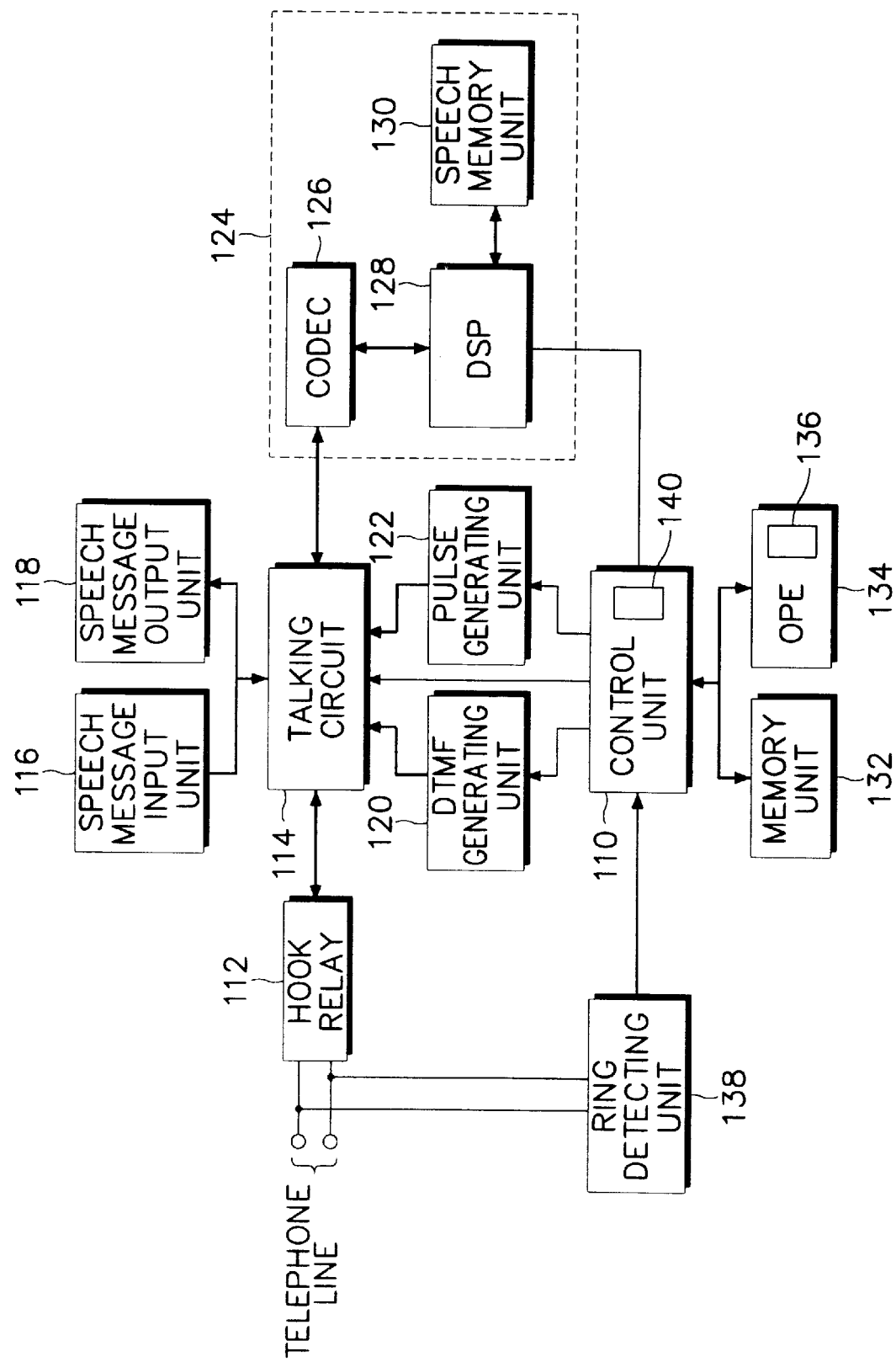
FIG. 1 is a block diagram illustrating an automatic telephone answering system constructed according to the principles of the present invention.

Referring now to the drawings and particularly to FIG. 1, which illustrates an automatic telephone answering system constructed according to the principles of the present invention. The automatic telephone answering system which is capable of transferring a registered speech message to a designated telephone number at a reserved time as contemplated by the present invention, includes a control unit 110 for controlling operation of the system, a hook relay 112, a talking circuit 114, a speech message input unit 116, a speech message output unit 118, a dual-tone multi-frequency (DTMF) generating unit 120, a pulse generating unit 122, an automatic answering unit 124 having a coder-decoder (CODEC) 126, a digital signal processor (DSP) 128, a speech memory unit 130, a memory unit 132, an operational panel (OPE) 134 having a display unit 136, and a ring detecting unit 138.

Referring to FIG. 1, the control unit 110 which receives an output from the OPE 134, controls the entire operation of the telephone answering system including dialing a registered telephone number at a reserved time and transferring the desired speech message to the registered telephone. A talking circuit 114 is connected to a telephone line via a hook relay 112. The talking circuit 114 serves to interface ring signals, tone signals and speech message signals between the telephone and the telephone line under the control of the control unit 110. The talking circuit 114 is also coupled to the speech message input unit 116, the speech message output unit 118 and the coder-decoder (CODEC) 126 to facilitate the recording of an incoming message and the reproduction of an outgoing message under the control of the control unit 110. The hook relay 112 serves to establish a speech channel between the telephone and a public telephone network and to cut off the speech channel under the control of the control unit 110.

The speech message input unit 116 comprises a microphone or a transmitter which converts a speech signal generated from a subscriber into an electrical signal. The speech message output unit 118 comprises a speaker or a receiver which converts an electrical signal into a speech signal, thereby generating an audible tone. The DTMF generating unit 120 is coupled to the talking circuit 114, and converts telephone number data output from the control unit 110 into a DTMF signal which is, in turn, output at the talking circuit 114. A pulse generating unit 122 is also coupled to the talking circuit 114, and generates a pulse signal such as an alarm under the control of the control unit 110. The pulse signal from the pulse generating unit 122 is applied to the talking circuit 114. The CODEC 126 is included in the automatic answering unit 124 which also includes the DSP 128 and the speech memory unit 130. The automatic answering unit 124 is registered with a speech message and manages the registered speech message. The DSP 128 processes a digital signal received therein to convert the received digital signal into numeric data under the control of the control unit 110. The numeric data from the DSP 128 is stored in the speech memory unit 130. The DSP 128 also reads out selected numeric data from the speech memory unit 130 and converts the data into a digital signal. The speech memory unit 130 stores numeric data sent from the DSP 128 therein. A memory unit 132 is also coupled to the control unit 110. The memory unit 132 stores control programs and a variety of data generated during the whole control operation. The OPE 134 includes a key matrix for generating key commands and key data for controlling an operation of the automatic telephone answering system in accordance with manipulation of a user, and a display unit 136 for providing a visual display of the operation state of the automatic telephone answering system under control of the control unit 110. A ring detecting unit 138 is connected to the telephone line coupled to the hook relay 112. The ring detecting unit 138 detects a ring corresponding to a call signal and sends the detected ring to the control unit 110. The control unit 110 is internally provided with a timer unit 140 which serves count clocks, thereby checking a current time.

Now, the method for transferring a registered speech message from the above-mentioned automatic telephone answering system at a reserved time in accordance with the present invention will be described in conjunction with FIGS. 2A to 4.

Figure 2A:
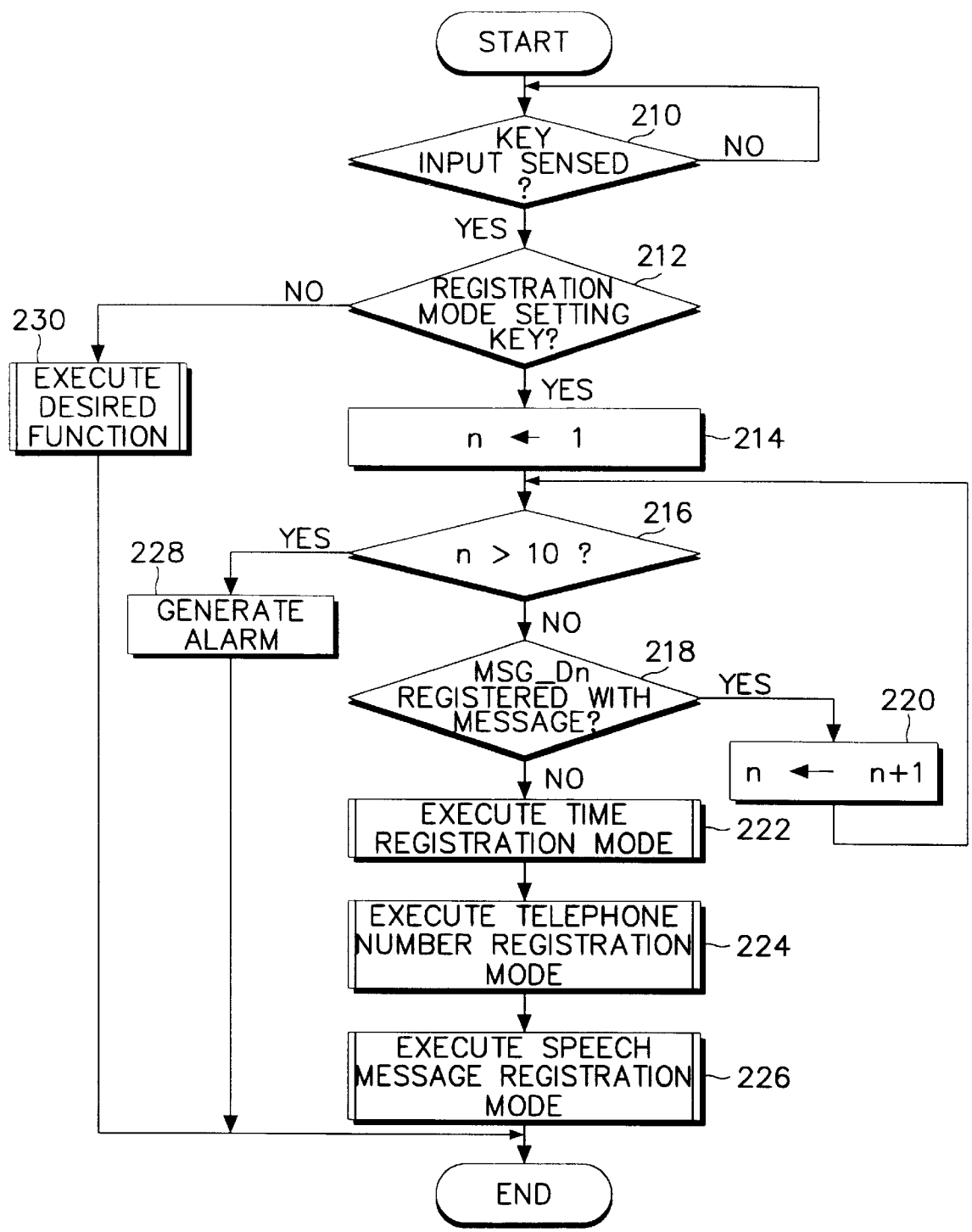
FIGS. 2A to 2D are flow charts illustrating a control procedure for executing a registration mode of the automatic telephone answering system constructed according to the principles of the present invention.
Figure 2B:
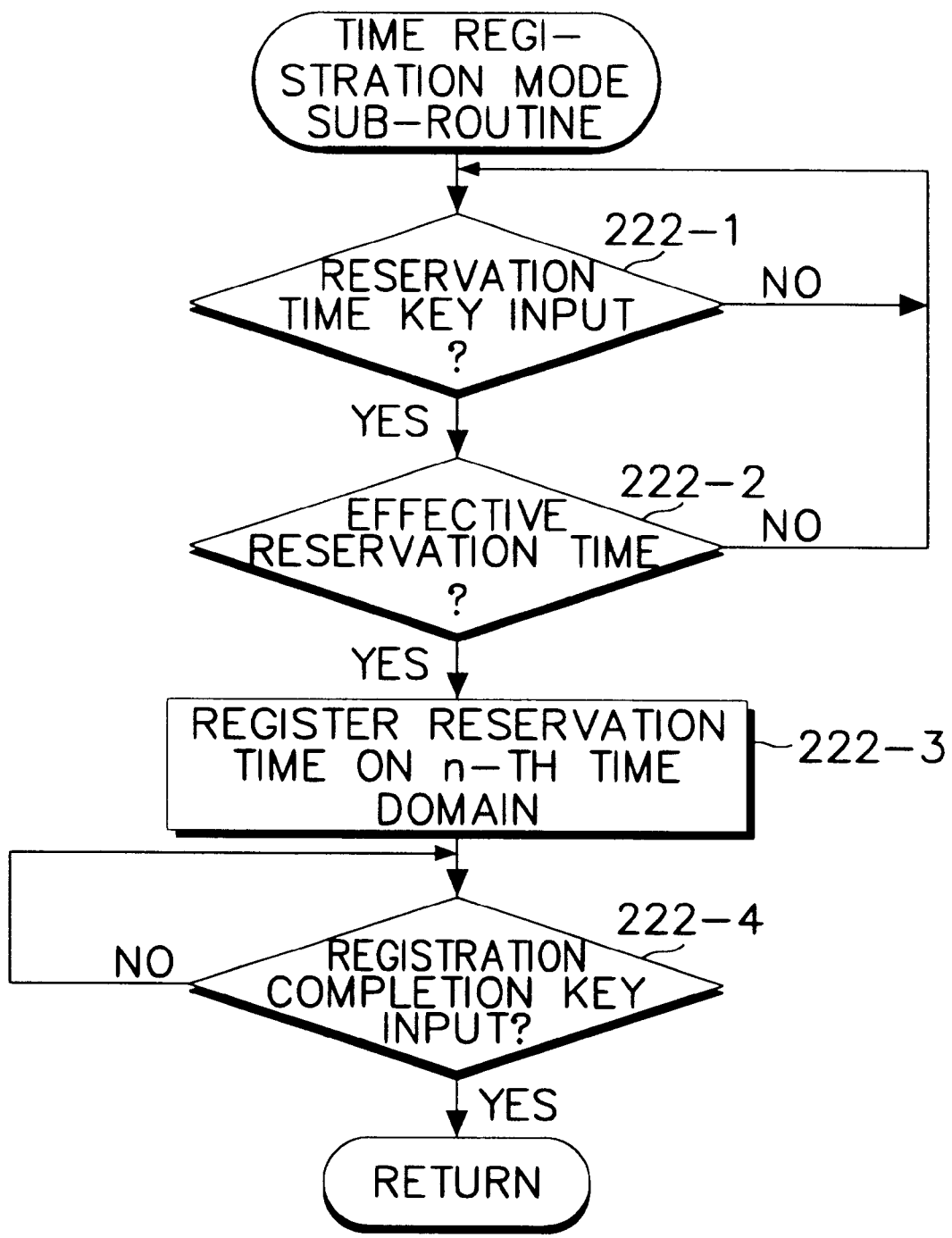
Figure 2C:
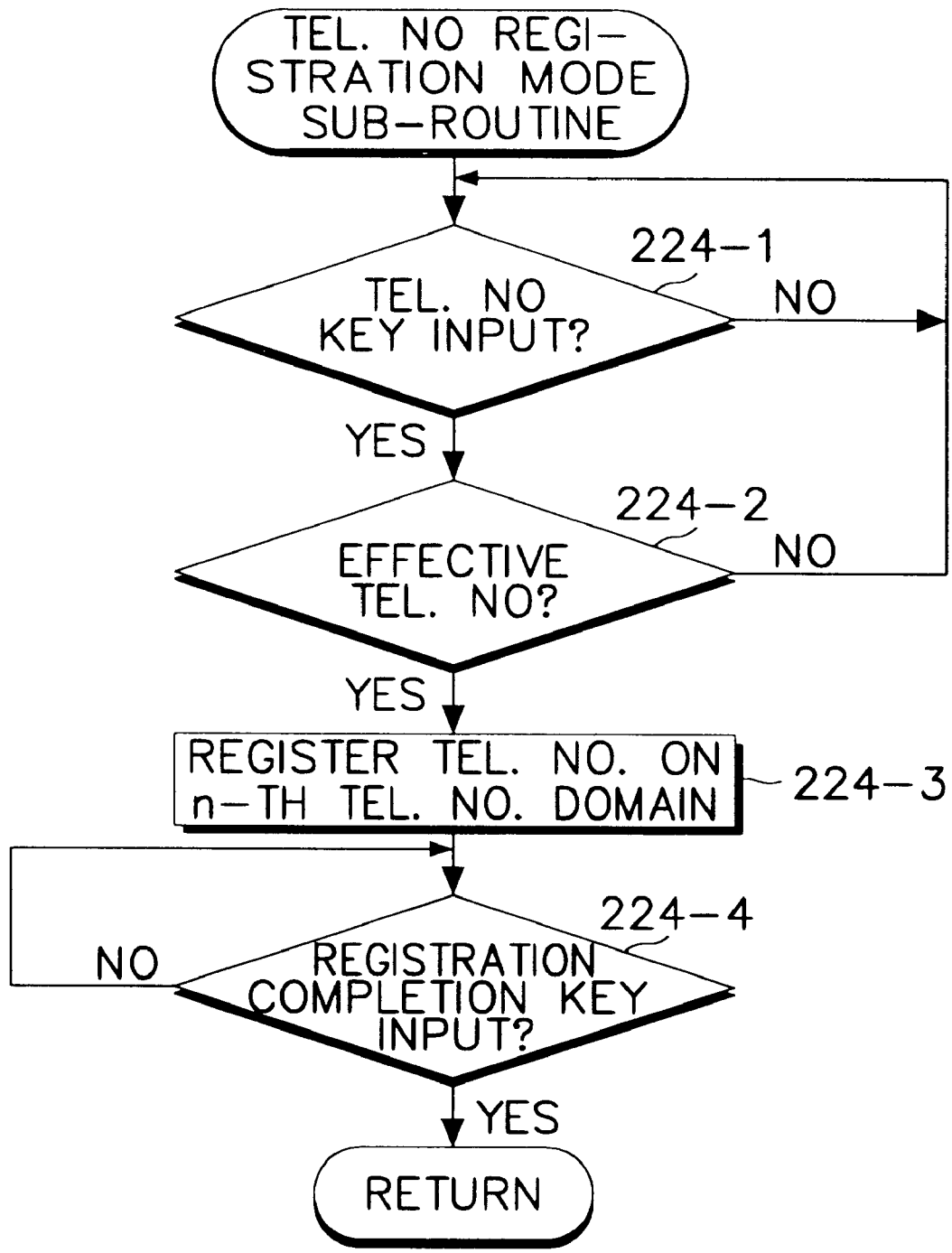
Figure 2D:
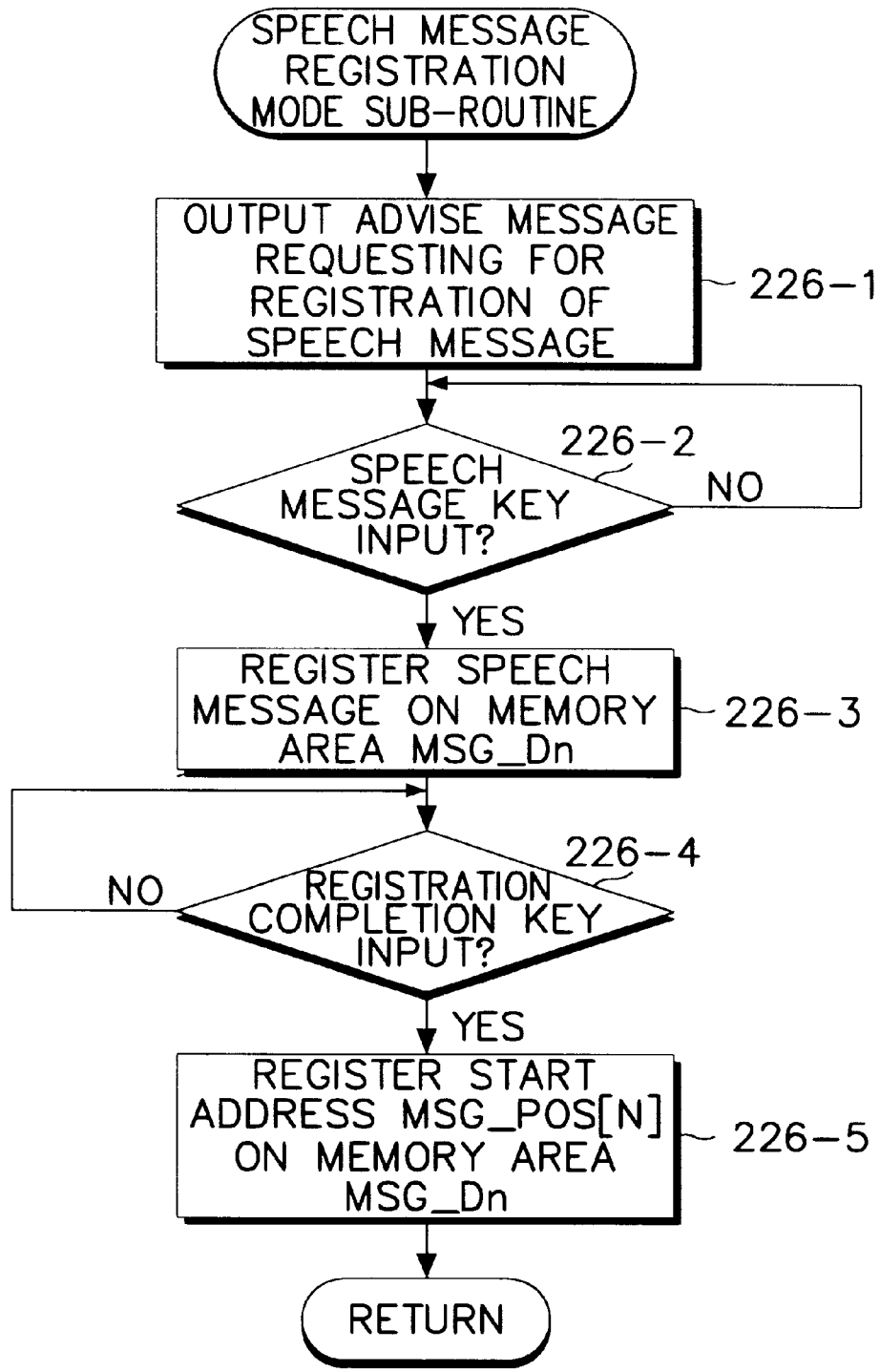

FIGS. 2A to 2D are flow charts illustrating a control procedure for executing a registration mode of the automatic telephone answering system constructed according to the principles of the present invention. FIG. 2A illustrates a control procedure of registering a reservation time, a telephone number and a speech message according to the present invention which includes the process of detecting a key input and checking whether or not the detected key input corresponds to a set key signal, detecting a memory area registered with no speech message using the counter when the detected key input corresponds to a set key signal, and executing an operation mode for registering a reservation time, a telephone number and a speech message when a memory area registered with no speech message is detected. FIG. 2B illustrates the registration operation of a reservation time, FIG. 2C illustrates the registration operation of a telephone number, and FIG. 2D illustrates the registration operation of a speech message.

Figure 3:
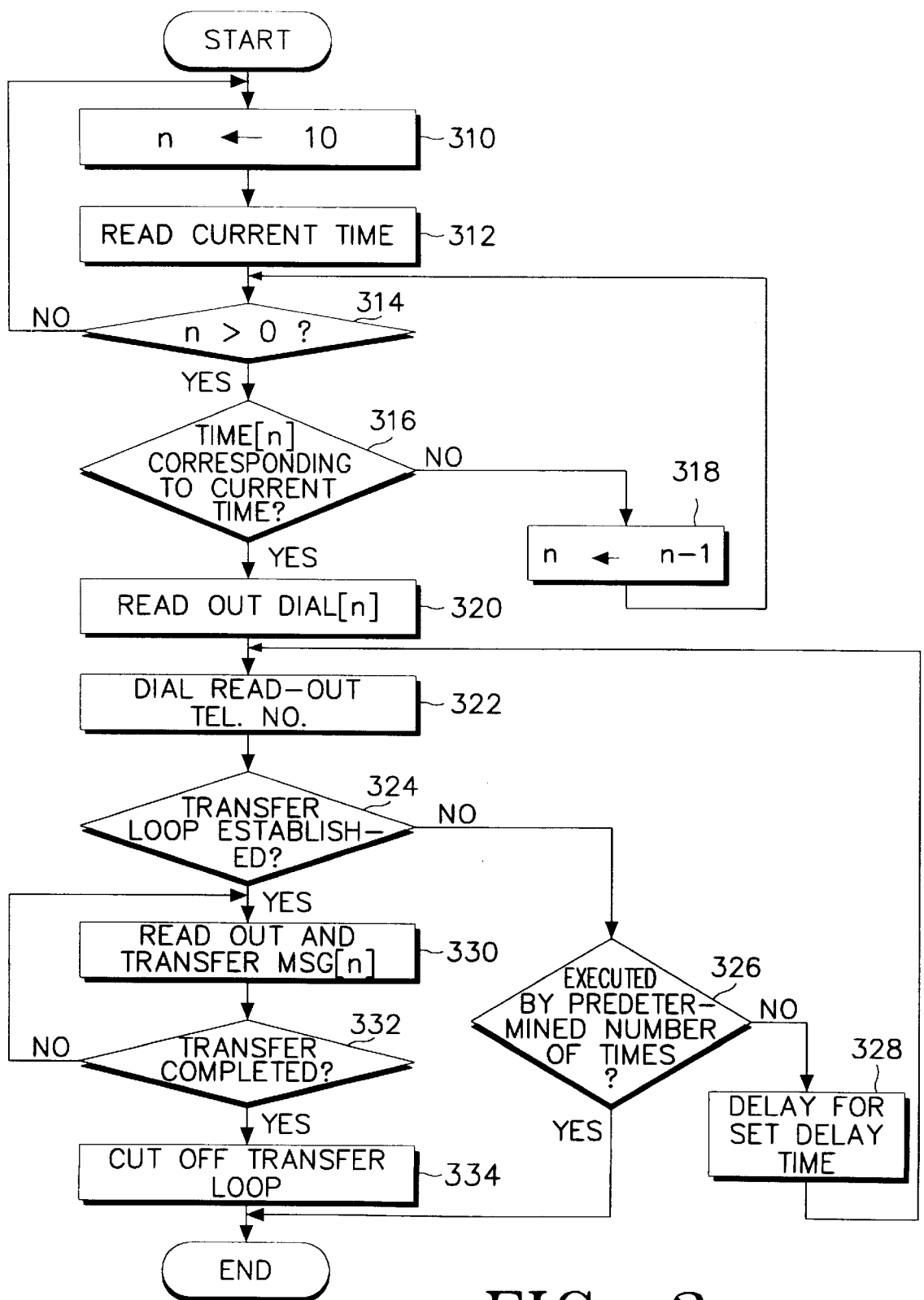
FIG. 3 is a flow chart illustrating a control procedure of transferring a registered speech message to a registered telephone number at a registered reservation time according to the principles of the present invention.

FIG. 3 illustrates, on the other hand, a control procedure of transferring a registered speech message at a registered reservation time. As shown in FIG. 3, the control procedure of transferring a speech message at a registered reservation time includes the process of reading the current time and comparing the read current time with the registered reservation time selected by the counter, reading out the registered telephone number and dialing the read-out telephone number, audibly synthesizing the registered speech message when a speech channel is established in accordance with the dialing operation, and, if no speech channel is established in accordance with the dialing operation, executing again the dialing operation by a predetermined number of times after delaying the execution of the dialing operation for a set delay time, and cutting off a message transfer routine when a transfer of the speech message is completed.

Figure 4A:
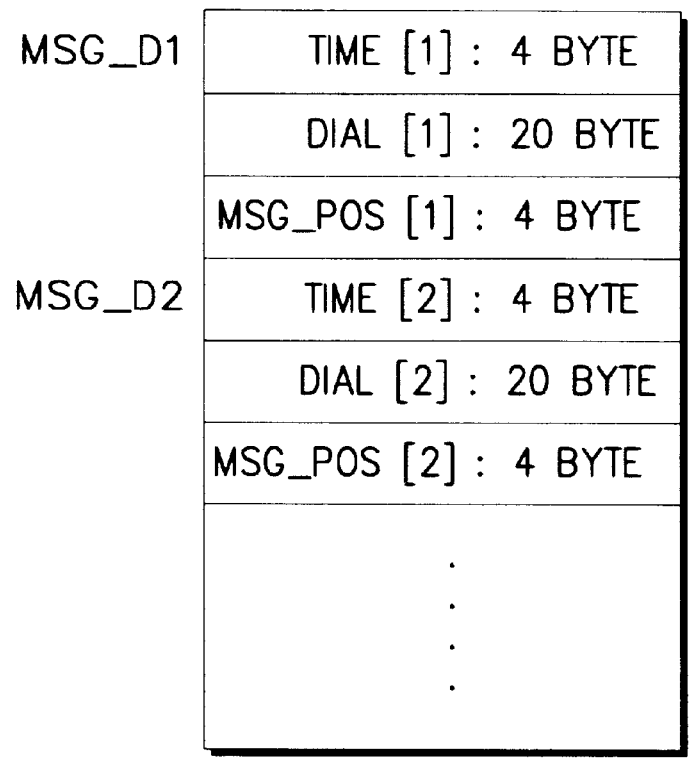
FIGS. 4A and 4B are diagrams illustrating memory tables contained in a memory unit of the automatic telephone answering system constructed according to the principles of the present invention.
Figure 4B:
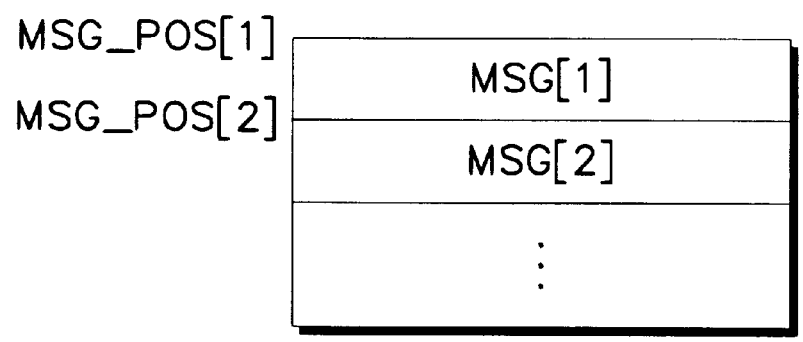

FIGS. 4A and 4B are diagrams illustrating memory tables stored in the memory unit 132 of the automatic telephone answering system constructed according to the principles of the present invention. FIG. 4A shows a memory table stored with reservation times TIME, telephone numbers DIAL and start addresses MSG_POS respectively associated with memory areas of the speech memory registered with speech messages MSG. FIG. 4B shows a speech memory table registered and stored with speech messages MSG respectively corresponding to the start addresses MSG_POS.

The procedure of registering a reservation time, a telephone number and a speech message and transferring the registered speech message to the registered telephone number at the registered reservation time will now be described in conjunction with the configuration shown in FIG. 1 and the flow charts of FIGS. 2A to 2D and FIG. 3.

First, a registration mode will be described in conjunction with FIG. 2A. As shown in FIG. 2A, the control unit 110 first senses whether or not a key signal is input from the OPE 134 at step 210. When a key signal is sensed at step 210, the control unit 110 determines whether or not the sensed key signal corresponds to a set key signal for setting a registration mode for registering a reservation time, a telephone number and a speech message. Where the sensed key signal is not any set key signal, the control unit 110 executes a function associated with the input key signal at step 230. When it is determined that the sensed key signal is the registration mode setting key, the control unit 110 sets a count value n of the counter to "1" at step 214. The count value n of the counter is used to determine a memory area on which a speech message is to be registered. The control unit 110 then compares the count value n with a predetermined memory area value at step 216 in order to determine whether or not the count value n is more than the predetermined memory area value. The predetermined memory area value is indicative of the number of given memory areas on which speech messages are to be registered. In the illustrated embodiment of the present invention, the predetermined memory area value is set to "10". Where the count value n of the counter is more than "10", the procedure advances to step 228. At step 228, the control unit 100 controls the pulse generating unit 122, thereby generating an alarm. On the other hand, when the count value n is not more than "10", the control unit 110 checks, at step 218, whether or not there is a speech message registered on the n-th memory region of the speech memory unit 130 corresponding to the count value n. Where it is determined at step 218 that there is a speech message registered on the n-th memory area, the count value n is incremented by one. Thereafter, step 216 is executed again. However, when it is determined that there is no speech message registered on the n-th memory area, the procedure advances to step 222. At step 222, the control unit 110 executes a sub-routine for a reservation time registration mode.

The reservation time registration mode sub-routine will now be described in conjunction with FIG. 2B. In the reservation time registration mode sub-routine, the control unit 110 first senses, at step 222-1, whether or not a key signal associated with a reservation time is input from the OPE 134. When the key signal is sensed, the control unit 110 determines, at step 222-2, whether or not the input key signal is indicative of an effective reservation time. When it is determined at step 222-2 that the input key signal is indicative of an effective reservation time, the control unit 110 executes step 222-3 and registers the effective reservation time on a time domain of the n-th memory area MSG_Dn in the memory unit 132. At step 222-4, the control unit 110 then senses whether or not a registration completion key, which is a particular key such as an * or # sign key, is input from the OPE 134. When the registration completion key informing of a completion of the reservation time registration is sensed, the procedure returns to step 224 of FIG. 2A.

At step 224, the control unit 110 executes a sub-routine for a telephone number registration mode. Now, the telephone number registration mode sub-routine will be described in conjunction with FIG. 2C. In the telephone number registration mode sub-routine, the control unit 110 first senses, at step 224-1, whether or not a key signal associated with a telephone number is input from the OPE 134. When the key signal is sensed, the control unit 110 determines, at step 224-2, whether or not the input key signal is indicative of an effective telephone number. When it is determined at step 224-2 that the input key signal is indicative of an effective telephone number, the control unit 110 executes step 224-3 and registers the effective telephone number on a telephone number domain of the n-th memory area MSG_Dn in the memory unit 132. At step 224-4, the control unit 110 then senses whether or not a registration completion key, which is a particular key such as an * or # sign key, is input from the OPE 134. When the registration completion key informing of a completion of the telephone number registration is sensed, the procedure returns to step 226 of FIG. 2A.

At step 226, the control unit 110 executes a sub-routine for a speech message registration mode. Now, the speech message registration mode sub-routine will be described in conjunction with FIG. 2D. In the speech message registration mode sub-routine, the control unit 110 first controls the DSP 128 at step 226-1 to read out and reproduce an advise message "Please register a speech message" stored in the speech memory unit 130 for a visual display on the display unit 136 of the OPE 134. At step 226-2, the control unit 110 senses whether or not a speech message to be registered is received via the speech message input unit 116 in response to the advise message. When the speech message is sensed, the control unit 110 executes step 226-3. At step 226-3, the DSP 128 is controlled to register the received speech message on the n-th memory area MSG_Dn of the speech memory unit 130. At step 226-4, the control unit 110 then senses whether or not a registration completion key, which is a particular key such as an * or # sign key, is input from the OPE 134. When the registration completion key informing of a completion of the speech message registration is sensed, the procedure advances to step 226-5. At step 226-5, the address MSG_POS[n] of the speech memory unit 130, at which the speech message is registered, is registered on an address domain of the n-th memory area MSG_Dn in the memory unit 132. When the above-mentioned registration is completed, the procedure returns to the last step of FIG. 2A. Thus, the whole registration procedure is completed.

Now, the procedure of automatically dialing a previously registered telephone number at a reservation time registered in accordance with the above-mentioned procedure, thereby automatically transferring a previously registered speech message, will be described in conjunction with FIG. 3.

First, the control unit 110 sets the count value n of the counter for selecting a memory area to the number of given speech memory areas at step 310. In the illustrated case, the count value n is set to "10". At step 312, the control unit 110 reads the current time from the timer 140 internally equipped therein. At step 314, the control unit 110 checks whether or not the set count value n is more than "0", thereby determining whether or not the reservation time checking has been completed up to for the last memory area. When it is determined at step 314 that the reservation time checking has been completed, the procedure returns to step 310 in order to set the count value n again. If not, the procedure advances to step 316. At step 316, the control unit 110 checks whether or not the reservation time registered on the reservation time domain TIME[n] of the n-th memory area MSG_Dn in the memory unit 132 corresponds to the current time read at step 312. When it is determined that the registered reservation time does not correspond to the current time, the procedure advances to step 318. At step 318, the control unit 110 increments the count value n of the counter for selecting the next memory area. The procedure then returns to step 314. However, when it is determined at step 316 that the registered reservation time corresponds to the current time, the procedure advances to step 320. At step 320, the control unit 110 reads out the telephone number DIAL[n] stored in the memory unit 132. The control unit 110 then controls the DTMF generating unit 120 to dial the read-out telephone number at step 322. Thereafter, the procedure advances to step 324. At step 324, the control unit 110 determines whether or not a transfer loop has been established. Where no transfer loop has been established, the procedure advances to step 326. At step 326, it is determined whether or not the dialing operation has been repeated by a predetermined number of times. When the dialing operation has been repeated by a predetermined number of times, the procedure is terminated. However, when it is determined that the dialing operation has not been repeated by a predetermined number of times, the procedure advances to step 328. At step 328, the procedure is delayed for a set delay time. The procedure then returns to step 322. Where it is determined at step 324 that a transfer loop has been established, the procedure advances to step 330. At step 330, the control unit 110 controls the DSP 128, thereby reproducing the speech message MSG[n] registered on the n-th memory area of the speech memory unit 130. The reproduced speech message MSG[n] is converted into an analog signal through the CODEC 126 and then transferred to the telephone line via the talking circuit 114. The transfer of the speech message is continued until it is determined at step 332 that the message transfer is completed. When it is determined at step 332 that the message transfer is completed, the procedure advances to step 334. At step 334, the control unit 110 controls the hook relay 112, thereby cutting off the transfer loop. Lastly, the control unit 110 may contains mechanism that is capable of, at the option of the user, automatically erasing the registered telephone number and the registered reservation time from the speech memory unit each time the speech message has been transmitted to the telephone set or receiver corresponding to the registered telephone number.

As apparent from the above description, the present invention provides a method for transferring a speech message registered by a user from an automatic telephone answering system at a reserved time wherein the reserved time and speech message are registered along with a telephone number so that the registered speech message can be automatically transferred at the reserved time as the telephone number is automatically dialed at the reserved time. Accordingly, there is a convenience in that a desired speech message can be transferred without using a direct telephone conversation. The present invention also provides an effect of accurately transferring a desired speech message, which has been previously registered, at a desired time.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof For example, while the present invention contemplates an independently operated automatic telephone answering system, the telephone answering system can be incorporated into a telephone set containing the same set of features. Therefore, it is intended that the present invention not be limited to the particular embodiment disclosed as the best mode contemplated for carrying out the present invention, but that the present invention includes all embodiments falling within the scope of the appended claims.

What is claimed is:

1. A method of transferring a registered speech message from an automatic telephone answering system at a registered reservation time, said method comprising the sequential steps of:

sensing a key signal is input from an operational panel of an automatic answering unit of said automatic telephone answering system;

determining whether said key signal corresponds to a set key signal for setting a registration mode for registering a reservation time;

performing a function of said key signal when it is determine that said key signal does not correspond to said set key signal;

setting a count value to one when said key signal is determined to correspond to said set key signal;

determining whether said count value is greater than a predetermined count value;

generating an alarm when it is determined that said count value is greater than said predetermined count value;

determining whether a registered message is stored in a memory area corresponding to said count value;

increasing said count value by one and returning to said step of determining whether said count value is greater than a predetermined count value, when it is determined that a registered message is stored in said memory area;

registering a reservation time, a telephone number and a speech message in said memory area when it is determined that a registered message is not stored in said memory area;

automatically dialing the registered telephone number at the registered reservation time to establish a communication channel over a telephone line; and automatically transferring the registered speech message via the telephone line when the communication channel is established.

2. The method as set forth in claim 1, wherein said step of registering a reservation time comprises a step of executing a time registration mode, said time registration mode comprising the steps of:

checking for an input from said operational panel of a key signal associated with a reservation time;

determining, when said key signal associated with the reservation time is detected, whether said key signal associated with the reservation time is indicative of an effective reservation time;

registering said reservation time in a time domain of said memory area, when it is determined that said key signal associated with the reservation time is indicative of an effective reservation time;

checking for an input signal from a registration completion key of said operational panel; and ending said time registration mode when an input signal from said registration completion key is detected.

3. The method as set forth in claim 1, wherein said step of registering a telephone number comprises a step of executing a telephone number registration mode, said telephone number registration mode comprising the steps of:

checking for an input from said operational panel of a key signal associated with a telephone number;

determining whether a detected key signal associated with a telephone number is indicative of an effective telephone number;

registering the telephone number in a telephone number domain of said memory area, when it is determined that the detected key signal associated with the telephone number is indicative of an effective telephone number;

checking for an input signal from a registration completion key of said operational panel; and ending said telephone registration mode when an input signal from said registration completion key is detected.

4. The method is set forth and claim 1, wherein said step of registering a speech message comprises executing a speech registration mode, said speech registration mode comprising the steps of:

generating a message requesting registration of a speech message;

checking for an input from said operational panel of a key signal associated with a speech message key;

registering a speech message in a speech domain of said memory area when an input from said operational panel of a key signal associated with a speech message key is detected;

checking for an input signal from a registration completion key of said operational panel; and ending said speech registration mode when said input signal from a registration completion key of said operational panel is detected.

5. The method as set forth in claim 1, wherein said step of automatically dialing the registered telephone number at the registered reservation time to establish a communication channel over a telephone line comprises the steps of:

setting said count value to said predetermined count value;

reading a current time;

determining whether said count value is greater than zero;

returning to said step of setting count value to said predetermined count value when it is determined that said count value is not greater than zero;

determining whether the registered reservation time in said memory area corresponding to said count value corresponds to said current time when it is determined that said count value is greater than zero;

reducing said count value by one and returning to said step of determining whether said count value is greater than zero when it is determined that said registered reservation time does not correspond to said current time;

reading out said registered telephone number from said memory area corresponding to said count value when it is determined that said registered reservation time corresponds to said current time;

dialing said registered telephone number read out from said memory area;

determining whether said communication channel is established after dialing said registered telephone number; and reading out said registered speech message from said memory area corresponding to said count value when it is determined that said communication channel is established.

6. The method as set forth in claim 5, wherein said step of automatically dialing the registered telephone number at the registered reservation time to establish a communication channel over a telephone line further comprises the steps of:

determining whether said dialing step has been performed a predetermined number of times;

returning to said dialing step when it is determined that said dialing step has not been performed said predetermined number of times; and ending said step of automatically dialing the registered telephone number when it is determined that said dialing step has been performed said predetermined number of times.

7. The method as set forth and claim 6, wherein said step of automatically dialing the registered telephone number at the registered reservation time to establish a communication channel over a telephone line further comprises a step of delaying said step of returning to said dialing step.

* * * * *